Patented Aug. 6, 1929.

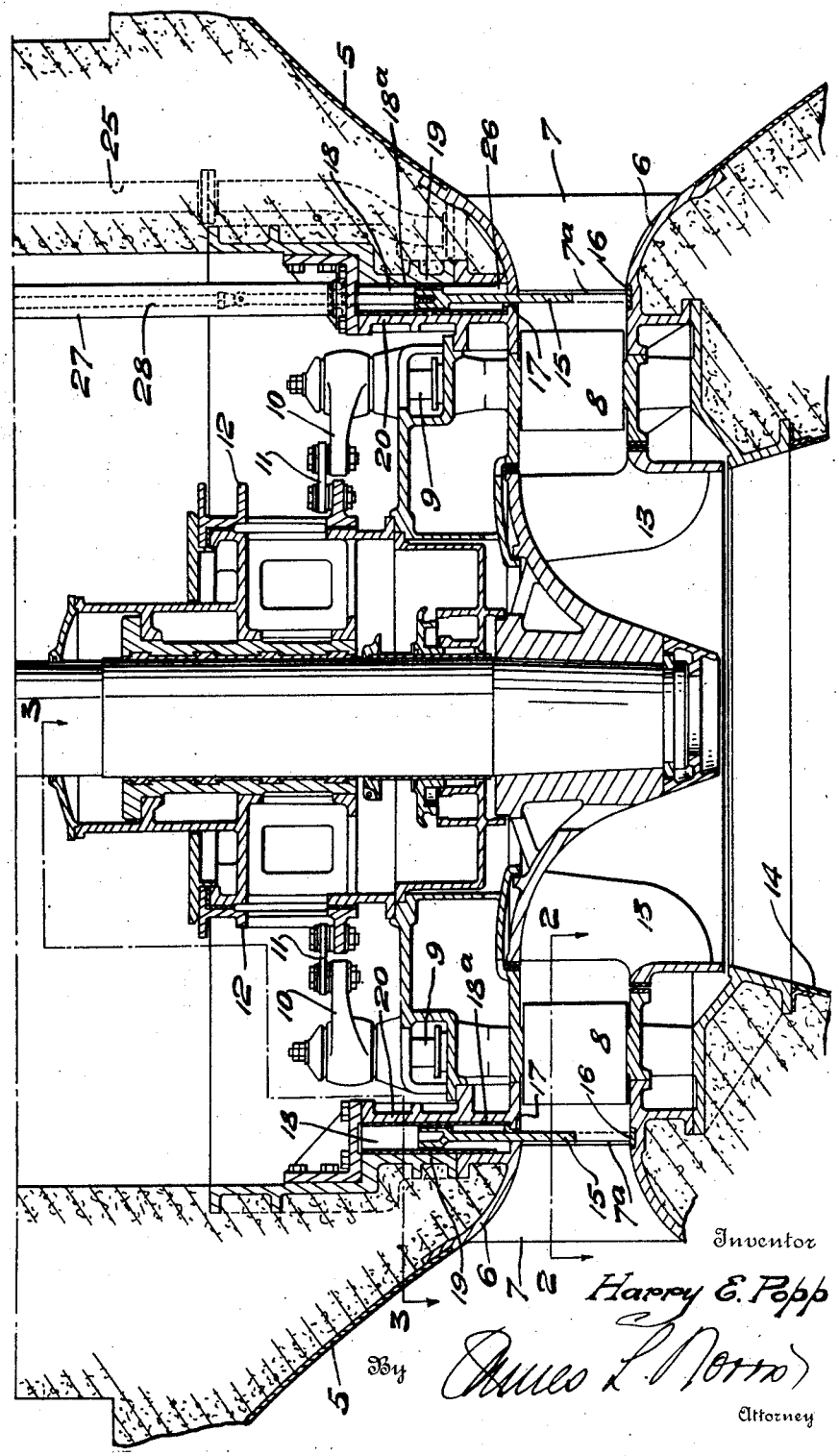

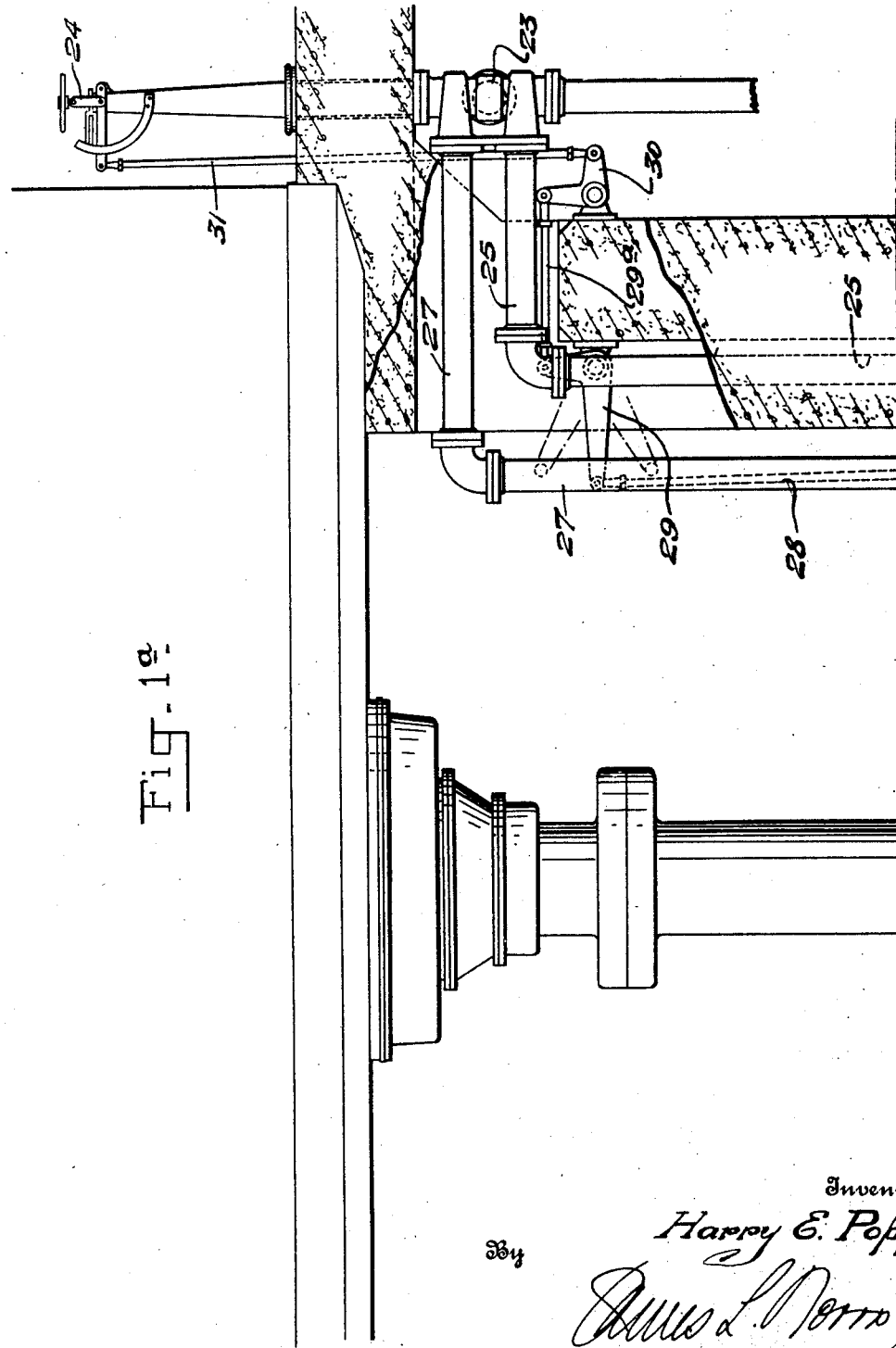

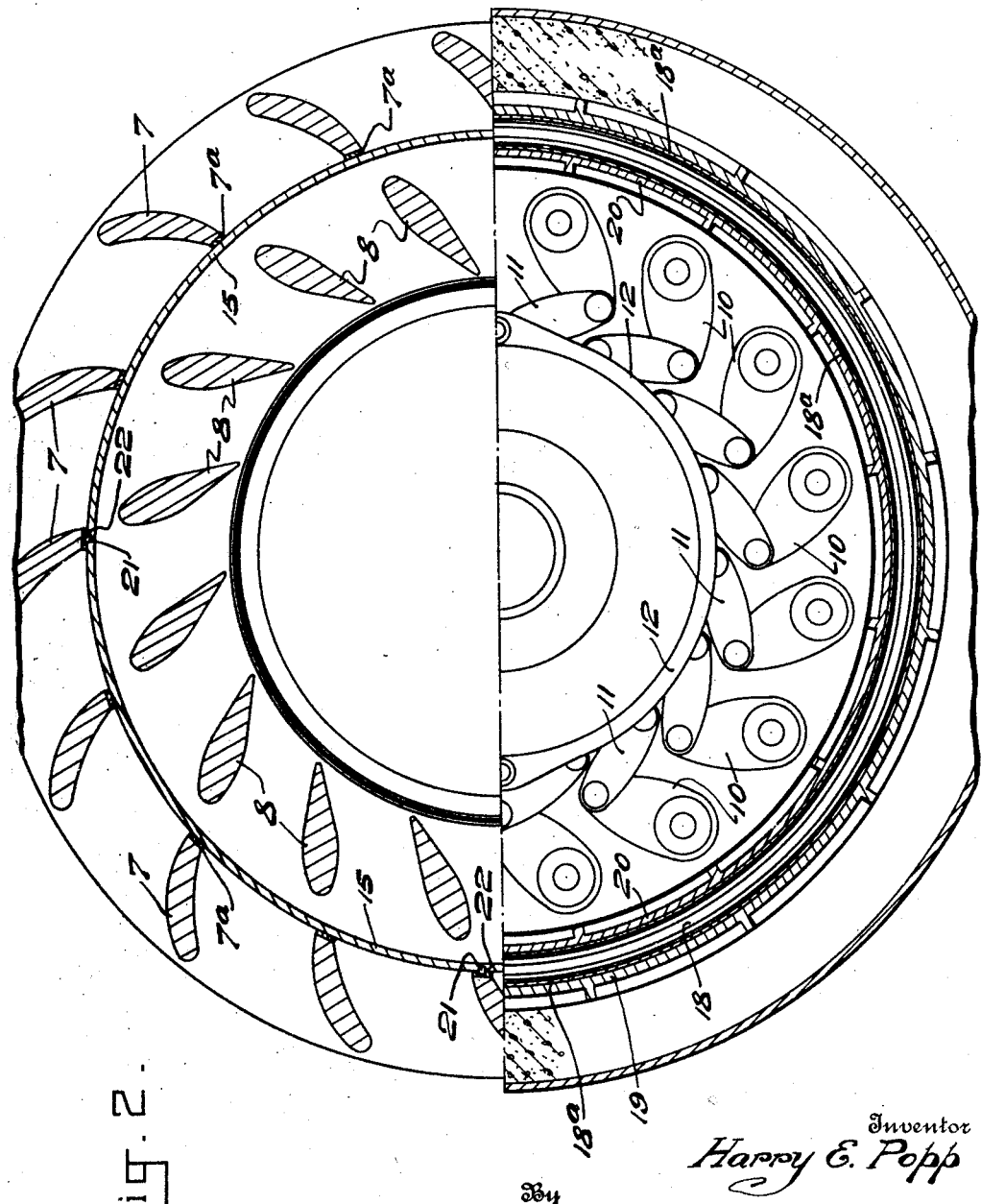

1,723,254

UNITED STATES PATENT OFFICE.

HARRY E. POPP, OF YORK, PENNSYLVANIA, ASSIGNOR TO S. MORGAN SMITH COMPANY, OF YORK, PENNSYLVANIA, A CORPORATION OF PENNSYLVANIA.

HYDRAULIC TURBINE.

Application filed December 6, 1926. Serial No. 152,952.

This invention relates to hydraulic turbines and particularly to a built-in cylindrical inlet valve for hydraulic turbines with wicket gates and is intended primarily for use with hydraulic turbines of the so-called spiral casing type.

The primary object of the invention is to provide a simple, efficient and relatively inexpensive shut-off valve formed as a part of the turbine structure and readily accessible for repair or replacement without dismantling the turbine structure proper.

A further object of the invention is to provide a closure, exterior of the wicket gates of a turbine, to prevent leakage of water through the gates into the runner when the turbine is shut down. This is a material advantage since regardless of the care and accuracy of construction, it is impossible to obtain tightness with the wicket gates alone.

With the foregoing and other objects and advantages in view, the invention consists in the preferred construction and arrangement of the several parts which will be more fully hereinafter described and claimed.

In the drawings:

Fig. 1 is a transverse vertical section through the lower portion of a turbine embodying the features of the invention;

Fig. 1ª is a continuation of Fig. 1, showing the upper portion of the turbine and installation; and Fig. 2 is a composite section of one-half of the lower turbine structure, respectively taken on the lines 2—2 and 3—3 of Fig. 1, the upper part of the section being on the line 2—2 and the lower part on the line 3—3.

The turbine in the present instance is supplied with water through the spiral casing 5, having at the annular opening thereof a speed ring consisting of two members 6, tied together with vanes 7. The purpose of these vanes is to guide the water to the wicket gates 8 and to form a tie across the throat opening of the casing to resist internal hydrostatic pressure. The wicket gates 8 are carried on the stems 9, usually integral with them but of any other preferred construction, the said wicket gates being connected by means of levers 10 and links 11 to the operating ring 12, which is caused to rotate by an automatic governor, not shown, thus varying the opening between the wicket gates through which the water passes, and in this manner regulating the amount of power developed by the turbine. The water leaving the wicket gates 8 enters the runner 13, where its energy is transformed into useful work, and finally leaves the runner, being discharged through the draft tube 14 into the tail race.

It will be noted from the above that the movement of the wicket gates varies the opening between them, and as hereinbefore stated, the adjustment of the opening between the wicket gates controls the amount of water passing through the turbine. It is possible to completely close the wicket gates so that they will be in contact with one another and thus prevent practically any water from entering the runner. It is, however, impossible to commercially build the wicket gates so that when they are closed they are absolutely water-tight, and the purpose of this invention is to provide an auxiliary means for shutting off the flow of water by obtaining a greater degree of tightness and thereby eliminating all leakage through the wicket gates.

In the ordinary form of turbine constructions in use today it is usual to provide at the inlet to the spiral casing a shut-off valve, which may be one of any of the generally accepted types of valves for this purpose. In every case, however, the shut-off valve is independent of the main portion of the turbine. The use of an independent valve in the usual form of turbine construction is for two primary purposes, namely, to obtain greater tightness when the turbine is shut down than the wicket gates alone permit, and to shut off the water from the turbine and permit inspection, repairs and dismantling of the turbine as may be necessary without unwatering the pen-stock. Since the valve is independent of the turbine, it becomes very expensive in application, especially in the larger sizes, and the improved built-in valve circumscribing the exterior of the wicket gates accomplishes both the purposes set forth above while at the same time is a part of the turbine itself and utilizes in its construction parts which are essential to the turbine. As a consequence, the cost of construction is materially reduced, the total cost of a turbine embodying the improved built-in valve being materially less than the combined cost of a turbine of usual form and an independent inlet valve.

The improved valve which circumscribes and is located exteriorly of the wicket gates 8 consists primarily of a sliding cylinder 15 with two seating surfaces; one seating surface at the lower end designated 16 and the other seating surface at the upper end as at 17. This valve slides in annular chambers 18 and 26, formed between the turbine speed ring flange and the pit liner 19 and valve housing 20, said chambers being of a continuous structure divided by the upper extremity or head of the said main valve 15. It should be noted that the speed ring with its upper flange and the pit liner bolted to it are parts which are usually found in a turbine structure of the type shown, so that economy is effected by their use as the outer wall of the annular chamber in which the valve slides. In the form of construction shown, the annular chambers 18 and 26 are completely lined with bronze, as at 18ᵃ. The tips of the speed ring vanes 7 are also faced with bronze strips 7ᵃ, against which the sliding cylinder 15 has movement, so that in any position of the said sliding cylinder or valve element, it is guided throughout its entire length. The purpose of the bronze facing is to prevent sticking due to corrosion, and the purpose of the guiding strips 7ᵃ on the speed ring vanes is to prevent tilting of the said valve element and consequent binding. Means are also provided to prevent rotation of the valve 15 in the form of a key 21 in one or more of the speed ring vanes sliding in a groove or grooves 22 in the outer surface of the valve element.

The purpose of the two seating surfaces 16 and 17 are as follows:

The seat 16 prevents water from leaking underneath the valve or valve element 15 when it is closed, and the seat 17 prevents water from leaking in from the outside of the valve up into the chamber 18 and then down through the clearance space between the valve and valve housing 20 into the turbine. Since both of these seats must be closed simultaneously, the lower one 16 is a metallic seat and the upper one 17 has some flexibility, so that as the valve or valve element 15 is closed, this seat will first make contact and will then yield sufficiently to permit the lower seat to tightly close.

The operation of the valve as shown is hydraulically controlled, and as shown the valve or valve element 15 is partially open. To open the valve or valve element 15 a four-way control valve 23 is provided and operated by a hand-wheel with a screw stem on the generator floor, as at 24, Fig. 1ᵃ. Movement of this four-way valve 23 admits water under pressure from the penstock through a pipe 25 into the annular chamber 26 formed between the valve or valve element 15 and the surface of the speed ring and pit liner on which it slides. Simultaneously the water in the valve chamber 18 is permitted to escape through the pipe 27 connected to the top of the said chamber and through the proper ports of the control valve 23 to atmospheric pressure. The result of supplying pressure to the chamber 26 and exhausting it from the chamber 18 is that there is an unbalanced upward hydrostatic force acting on the valve or valve element 15, causing the latter to rise, the magnitude of this force depending upon the area of the space or the chamber 26. It is obvious that if the valve is open and pressure is admitted to the chamber 18 and at the same time the pressure in the chamber 26 is exhausted by reversal of the control valve 23, there will be an unbalanced downward hydrostatic force acting upon the valve or valve element 15 which will force it down into closed position. It is also obvious that as soon as the control valve 23 is opened in one direction or the other, the valve or valve element 15 will begin to move and continue to move either upwardly or downwardly to its full open or closed position, until the control valve is again closed. This might under some conditions result in a too rapid movement of the valve or valve element 15, and for this reason compensating means are provided in the form of mechanical connections between the valve or valve element 15 and the control valve 23, so that as the said control valve is moved in one direction from its closed position, thus causing the valve or valve element to move, this movement of the valve element will be communicated through a compensating rod 28 and bell crank lever and rod connection 29 back to the control valve 23 and operate to restore the latter to its closed position. In order to obtain further movement of the valve or valve element 15, it is therefore necessary to again move the control valve 23 from its closed position by means of the hand wheel and stem on the generator floor, as at 24. This further movement of the valve or valve element 15 is then communicated to the control valve 23, restoring it to its closed position, so that in order to obtain full travel of the valve or valve element 15, it is necessary to continuously move the hand wheel operating the said control valve. In other words, the valve or valve element 15 will only move as long as the hand wheel operating the control valve 23, is being moved. For example, suppose the main valve 15 is wide open and it is desired to close it. The hand wheel on the control valve stand will be turned in such direction as to push the control valve 23 downwardly, thereby opening its ports and admitting pressure to the chamber 18 and exhausting pressure from the chamber 26. As the valve 15 starts to move downwardly, it pulls therewith the compensating rod 28 and the arm of the bell crank lever 29 to which said rod is attached. This in turn pulls the rod 29ᵃ to the left and causes the rod 31 to move upwardly. This upward movement of the rod 31 moves up the left-hand end of the short horizontal lever shown below the hand wheel and pivoted at its extreme right-hand end, and thus the upward movement of the rod 31 is communicated to the hand wheel and its stem, moving them up also, and bringing back the control valve 23 to its neutral or closed position. Obviously, this will stop the downward movement of the main valve 15, and before this movement can continue, the hand wheel must again be turned, forcing the control valve 23 again downward out of its closed position. This will start further downward movement of the valve 15, but as it moves, the compensating mechanism again acts to pull up the control valve 23 to its closed position. Thus in order to completely close the main valve 15, it is necessary to continue turning the hand wheel to keep the control valve 23 down below its closed position in spite of the upward movement imparted to it by the downward movement of the valve 15.

While it is obviously preferred that the valve or valve element 15 be operated by hydraulic means as just explained, the same operation could be obtained through mechanical means of a suitable character.

The advantages of this improved structure, or the mounting of the valve or valve element outside of the wicket gates so that practically a non-leaking tightness can be obtained, are obvious and the cost of providing this improved valve structure is reduced to a minimum, since the speed ring and pit liner are necessary parts of the turbine itself. Furthermore, the other parts necessary to complete the improved valve structure are comparatively inexpensive. The improved valve structure closes at a point in the water passage where the area is very much less than at the inlet to the spiral casing, which results in a smaller and less expensive closing element than is possible with the ordinary type of independent inlet valve. The distance which the cylindrical valve element must travel to open and close the same is very much less than with the ordinary type of independent valve, and consequently a quicker opening and closing operation is possible. As heretofore indicated, the location of the improved cylinder valve outside of the wicket gates permits dismantling the entire turbine inside of the improved valve for repairs without unwatering the penstock and spiral casing.

What is claimed as new is:

1. In a turbine, the combination with wicket gates, a runner with which said gates cooperate, a spiral inlet and a speed ring and pit liner, of a sliding cylinder operating in a chamber inside of the speed ring and pit liner but outside of the wicket gates, pipes communicating with the opposite ends of the said chamber and also with a control valve, and compensating means connecting the said sliding cylinder with the control valve.

2. In a turbine, the combination with a runner, wicket gates and an inlet, of a built-in sliding cylinder constituting a valve disposed outside of the wicket gates and between the latter and the inlet, the valve having sliding movement in an annular chamber formed above the same and also provided with two seating surfaces respectively at the lower and upper ends thereof, the seating surface at the upper end of the valve closing on a yieldable seat to provide for close fitting of the lower end of the cylinder with the lower seating surface, and means for operating the said cylinder and controllable at a distance from the later.

3. In a hydraulic turbine, the combination with a wicket gate, a speed ring having a flange and pit liner, of a chamber formed between the inlet of the turbine and the wicket gates, a cylindrical valve operating in said chamber, one of the walls of the chamber at least being formed by the speed ring flange and pit liner, and means for operating the said cylindrical inlet valve to open and close the same.

4. In a turbine, the combination with wicket gates, a runner with which said wicket gates cooperate, a spiral inlet and a speed ring and pit liner, of an annular chamber located outside of and circumscribing the outer portion of the wicket gates between the later and said inlet, a cylinder forming a built-in valve and movable in said chamber, and means for operating the said cylinder.

5. In a turbine, the combination with wicket gates, a runner with which said gates cooperate, and a spiral inlet, of a speed ring having a flange, a pit liner, an inner valve housing, the speed ring flange, the pit liner and the inner valve housing forming a chamber located exteriorly of the wicket gates and between the latter and the inlet, the chamber being provided with two seating surfaces at the upper and lower portions thereof, and a sliding cylinder operating in said chamber and adapted to engage the said seating surfaces.

6. In a turbine, the combination with wicket gates, a runner with which said gates cooperate, and a spiral inlet, of a speed ring having a flange, a pit liner, an inner valve housing, the speed ring flange, the pit liner and the inner valve housing forming a chamber located exterior of the wicket gates and between the latter and the inlet and having upper and lower seating surfaces, a sliding cylinder mounted to operate in said chamber and to cooperate with the said seating surfaces, the chamber being completely lined with bronze and also the surfaces of the sliding cylinder which are in contact with the sides of the chamber, and means for operating the sliding cylinder to open and close the same.

7. In a turbine, the combination with wicket gates, a runner with which said gates cooperate, and a spiral inlet, of a speed ring having a flange and speed ring vanes, a pit liner, an inner valve housing, a chamber being formed between the speed ring flange, pit runner and valve housing, a sliding cylinder movable into and outwardly from the chamber, the chamber being completely lined with bronze and also the surfaces of the said cylinder which are in contact with the sides of the chamber, the tips of the speed ring vanes being also faced with bronze strips against which the cylinder slides so that in any position of the cylinder it is guided throughout the entire length, and means for operating the said sliding cylinder to control the opened and closed positions of the same.

In testimony whereof I have hereunto set my hand.

HARRY E. POPP.